United States Patent [19]
Bennett

[11] Patent Number: 5,649,803
[45] Date of Patent: Jul. 22, 1997

[54] MOTORCYCLE RAMP

[75] Inventor: Gary R. Bennett, Tulsa, Okla.

[73] Assignee: Auto Connection, Inc., Tulsa, Okla.

[21] Appl. No.: 509,774

[22] Filed: Aug. 1, 1995

[51] Int. Cl.⁶ .................................................. B60P 3/06
[52] U.S. Cl. ................................. 414/537; 414/786
[58] Field of Search .......................... 414/537, 538, 414/491, 492, 507, 462, 679, 539, 525.1, 786

[56] References Cited

U.S. PATENT DOCUMENTS

| | | | |
|---|---|---|---|
| 2,188,374 | 1/1940 | Sanchez | 414/538 |
| 2,387,082 | 10/1945 | Malling | 414/538 X |
| 2,604,219 | 7/1952 | Alvare | 414/538 |
| 3,687,314 | 8/1972 | Haugland | 414/537 X |
| 3,720,333 | 3/1973 | Vaughn | 414/462 |
| 3,726,423 | 4/1973 | Miron | 414/538 X |
| 3,734,321 | 5/1973 | Long et al. | 414/538 X |
| 3,843,001 | 10/1974 | Willis | 414/462 |
| 3,941,261 | 3/1976 | Ricci | 414/537 |
| 4,274,788 | 6/1981 | Sutton | 414/538 X |
| 4,790,713 | 12/1988 | Miller | 414/462 |
| 4,932,829 | 6/1990 | Miller | 414/462 |
| 5,137,413 | 8/1992 | Ressler | 414/474 |
| 5,183,372 | 2/1993 | Dinverno | 414/538 |
| 5,234,307 | 8/1993 | Scott | 414/467 |
| 5,331,701 | 7/1994 | Chase et al. | 414/537 X |
| 5,394,583 | 3/1995 | Plate | 414/538 |
| 5,431,525 | 7/1995 | Scott | 414/538 |

FOREIGN PATENT DOCUMENTS

| | | | |
|---|---|---|---|
| 1409452 | 7/1965 | France | 414/538 |
| 235132 | 10/1987 | Japan | 414/538 |
| 166437 | 6/1992 | Japan | 414/491 |

Primary Examiner—David A. Bucci
Attorney, Agent, or Firm—Molly D. McKay, P.C.

[57] ABSTRACT

A motorcycle ramp which is installed in a rear passenger compartment of a wheelchair converted van to allow a full-size motorcycle to be loaded into, transported within and unloaded out of the van by a single person. Parallel supporting rods are mounted to the floor of the van at an incline so the front end of the supporting rods are higher than their rear ends. A plate onto which the front wheel of the motorcycle can be driven and secured is movably provided mounted on the support rods. The plate is provided with a first reversible motor, activated by a first three-way switch in order to move the plate forward or rearward on the supporting rods. The plate is also provided with a second reversible motor, activated by a second three-way switch in order to simultaneously move a clamping member and rear pushing member toward a stationary upright member, thereby securing the motorcycle's front wheel between the stationary upright member and the clamping member and between a front guide member provided on the plate and the rear pushing member. The second reversible motor also may be activated by the second three-way switch to release the motorcycle's front wheel from the motorcycle ramp.

9 Claims, 6 Drawing Sheets

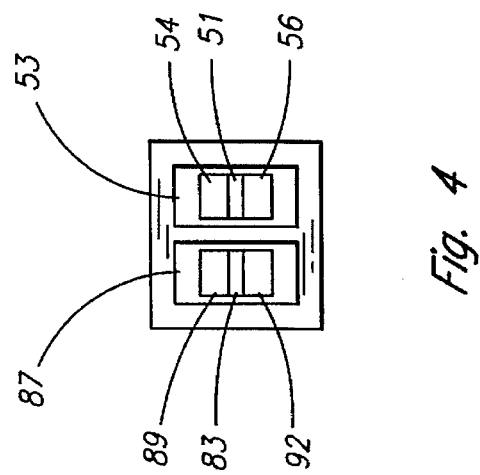
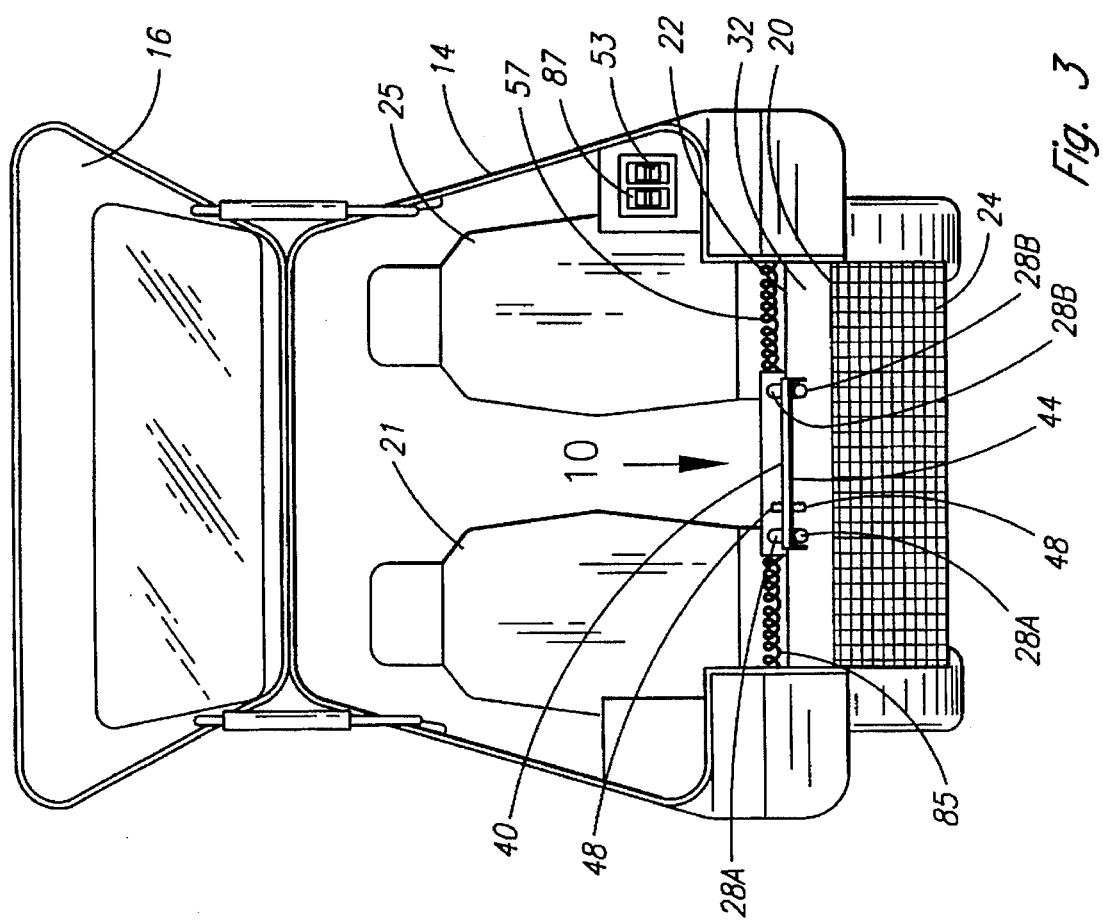

MOTORCYCLE RAMP

BACKGROUND OF THE INVENTION

1. Field of the Invention

The present invention relates to a device and method for loading a motorcycle into and unloading the motorcycle out of a mini-van in order that the motorcycle can be transported within the mini-van.

2. Description of the Related Art

Motorcycle enthusiasts often want to carry their motorcycles with them as they travel in their mini-vans. Being able to take a motorcycle along with a mini-van would be particularly useful when going on vacation, going to a motorcycle show, or at other times when it would be desirable to take along a second means of transportation.

The motorcycle could be loaded onto a separate trailer which could be pulled behind a mini-van or could be mounted in a vertical orientation to the exterior of the mini-van. However, if a motorcycle could be loaded into the rear passenger area of a mini-van, the motorcycle could be maintained in a clean condition while being transported. It would be desirable to maintain the motorcycle in an upright position while it is within the mini-van so that oil and gasoline do not leak out of the motorcycle, thus preventing an oily mess from being created in the interior of the mini-van.

Currently, it is not possible to transport a full-sized motorcycle in an upright orientation within a mini-van. One impediment to such transportation is that the length from the front to the rear of the motorcycle exceeds the length of the rear passenger area of the mini-van. Also, another impediment to such transport is that there is not sufficient headroom in the rear passenger area of mini-vans to allow the motorcycle to be driven into the mini-van.

Still another impediment to such transport is related to the motorcycle's instability in an upright position as it is moved into and out of the mini-van. A full-size motorcycle is quite heavy and tends to tip over easily, particularly when the rider has dismounted. Because of the low headroom in the passenger compartment of the mini-van, the rider must dismount the motorcycle while the motorcycle is positioned at an inclined angle on a ramp at the rear of the mini-van. The motorcycle is particularly unstable when positioned at an inclined angle since it tends to roll backward and tip to either side as the rider dismounts. This makes it extremely difficult for the dismounting rider to hold the motorcycle upright and simultaneously keep the motorcycle from rolling backward on the ramp. Generally, the rider will require assistance in holding the motorcycle upright as he dismounts it, and after dismounting, will require assistance in rolling the motorcycle into the rear passenger compartment of the mini-van.

The present invention addresses each of these impediments by providing a motorcycle ramp which mounts within a mini-van previously modified to accommodate entry of a wheelchair via the back of the rear passenger compartment. Such wheelchair converted mini-vans are commercially available from Braun Corporation, located at 1014 S. Monticello, Winamac, Ind. 46996, or a variety of other sources.

One object of the present invention is to provide a means for transporting a full-size motorcycle in an upright position and fully contained within the rear passenger compartment of a mini-van.

Still a further object of the invention is to provide a device which allows a single person to load a motorcycle into a mini-van and also unload the motorcycle from the mini-van without any additional assistance.

Another object of the invention is to provide a means to stabilize and hold a motorcycle upright as the rider dismounts and remounts the motorcycle while the motorcycle is resting on an inclined surface.

Another object of the invention is to provide a motorcycle ramp which will not interfere with normal use of the rear passenger area when a motorcycle is not being transported.

SUMMARY OF THE INVENTION

The present invention is a motorcycle ramp which mounts in a rear passenger compartment of a mini-van in order to enable a single person to load a motorcycle into, transport the motorcycle within and unload the motorcycle out of the mini-van unassisted. The motorcycle ramp is installed in a van which has previously been converted to admit a wheelchair via a rear door provided in the rear end of the van.

The van is provided with a lowered rear floor in the rear passenger compartment and a normal floor in the front passenger compartment and a ledge where the lowered rear floor and the normal floor meet, just rearward of the driver's seat and front passenger seat of the van. The van is also provided with a rear van ramp which may be lowered to the ground and is equipped so the rear end of the van can reversibly squat on its rear axle.

A pair of parallel supporting rails are mounted parallel to and on either side of a longitudinal axis of the van, with their front ends mounted to the normal floor at the ledge and their rear ends mounted to the lowered rear floor adjacent the rear van ramp. A removable ramp is removably positioned between the rear ends of the supporting rails and the rear van ramp in order that a front wheel of the motorcycle can travel up the rear van ramp, up the removable ramp and onto a movable plate. The movable plate is provided on its lower surface with rotatable wheels which support the plate and allow it to move along the supporting rails.

The lower surface of the plate is provided with a first reversible motor which is operated by a first three-way switch to which it is electrically connected via a first electrical cable. The first reversible motor is provided with electricity via a second electrical cable which connects to the van. The first reversible motor is provided with a gear which operatively engages a rack. The rack is provided between and parallel to the supporting rods, with its front end secured to the normal floor between the front ends of the supporting rods and with its rear end secured to the lowered rear floor between the rear ends of the supporting rods. When the first three-way switch is placed in its forward position, the first reversible motor is activated, turning its associated gear and thus pulling the plate toward the front ends of the supporting rods and rack until the plate reaches its most forward position. When the first three-way switch is placed in its reverse position, the first reversible motor is activated in a reverse direction, turning its gear in a reverse direction and thus pushing the plate toward the rear ends of the supporting rods and rack until the plate reaches its most rearward position. To stop movement of the plate, the first three-way switch is placed in its middle or off position.

The plate has an opposite upper surface. A stationary upright member is provided on one side of the upper surface and extends upward therefrom. An adjustable inverted U-shaped front guide member attaches to the same side of the upper surface as the stationary upright member and slightly forward of the stationary upright member. The front guide member extends upward from the plate, over a front portion of the upper surface so that it may removably receive a front wheel of a motorcycle. The front guide member is provided with two upward extending arms connected together by an upwardly extending valley portion to create the inverted U-shape of the front guide member.

The lower surface of the plate is provided with a second reversible motor which is operated by a second three-way switch to which it is electrically connected via the first electrical cable. The second reversible motor is provided with electricity via the second electrical cable which connects to the van. The second reversible motor is provided with a second gear which operatively engages a threaded leg of a U-shaped second rod. The threaded leg extends below the plate. The U-shaped second rod is movably provided perpendicular to the longitudinal axis of the van, with its threaded leg and a second leg lying horizontal with the threaded leg being adjacent the lower surface of the plate and the second leg being adjacent the upper surface of the plate. The U-shaped second rod is movably provided on a side of the plate opposite where the stationary upright member is located. The second leg of the U-shaped second rod is provided with a clamping member which extends upward from the upper surface of the plate at an angle and is also provided with a rear pushing member which also extends upward from the upper surface. The pushing member is located closer to the stationary upright member than the clamping member.

When the second three-way switch is placed in its close position, the second reversible motor is activated, turning its associated second gear and thus pulling the U-shaped second rod, the attached clamping member and the attached pushing member toward the upright stationary member. To load the motorcycle into the van, the front wheel of the motorcycle is positioned on the plate with the front portion of the front wheel abutting the upward extending valley portion of the front guide member. The second three-way switch is then placed in its close position, and the pushing member moves behind a rear portion of the front wheel and, simultaneously, the clamping member moves toward the stationary upright member, thereby locking the front wheel therebetween. The second three-way switch is placed in its middle or off position to stop movement of the U-shaped second rod.

With the front wheel of the motorcycle thus locked to the motorcycle ramp, the removable ramp is removed, and the first three-way switch is activated to pull the plate and attached motorcycle forward into the van. Once the motorcycle is fully loaded into the van, with its rear wheel resting on the lowered rear floor, traditional tie-down devices may be used to secure the motorcycle upright for transport within the van. The rear van ramp can then be raised, the van raised out of its squat position and the rear door closed.

In order to remove the motorcycle from the van, the rear door is opened, the van is caused to squat on its rear axle, the rear van ramp is lowered to the ground, and the tie-downs are removed. The first three-way switch is then placed in its reverse position, thus pushing the motorcycle out of the van. The removable ramp is then reinstalled. The second three-way switch is then placed in its open position to release the motorcycle from the motorcycle ramp. The released motorcycle can then be rolled out of the van.

BRIEF DESCRIPTION OF THE DRAWINGS

FIG. 3 is a rear elevation of the van and motorcycle ramp of FIG. 1 with the motorcycle, removable ramp, stationary upright member, front guide member, U-shaped second rod, clamping member, rear pushing member, and both reversible motors removed.

FIG. 4 is an enlarged view of the three-way switches of FIG. 3.

DETAILED DESCRIPTION OF THE PREFERRED EMBODIMENT

Figure 1:
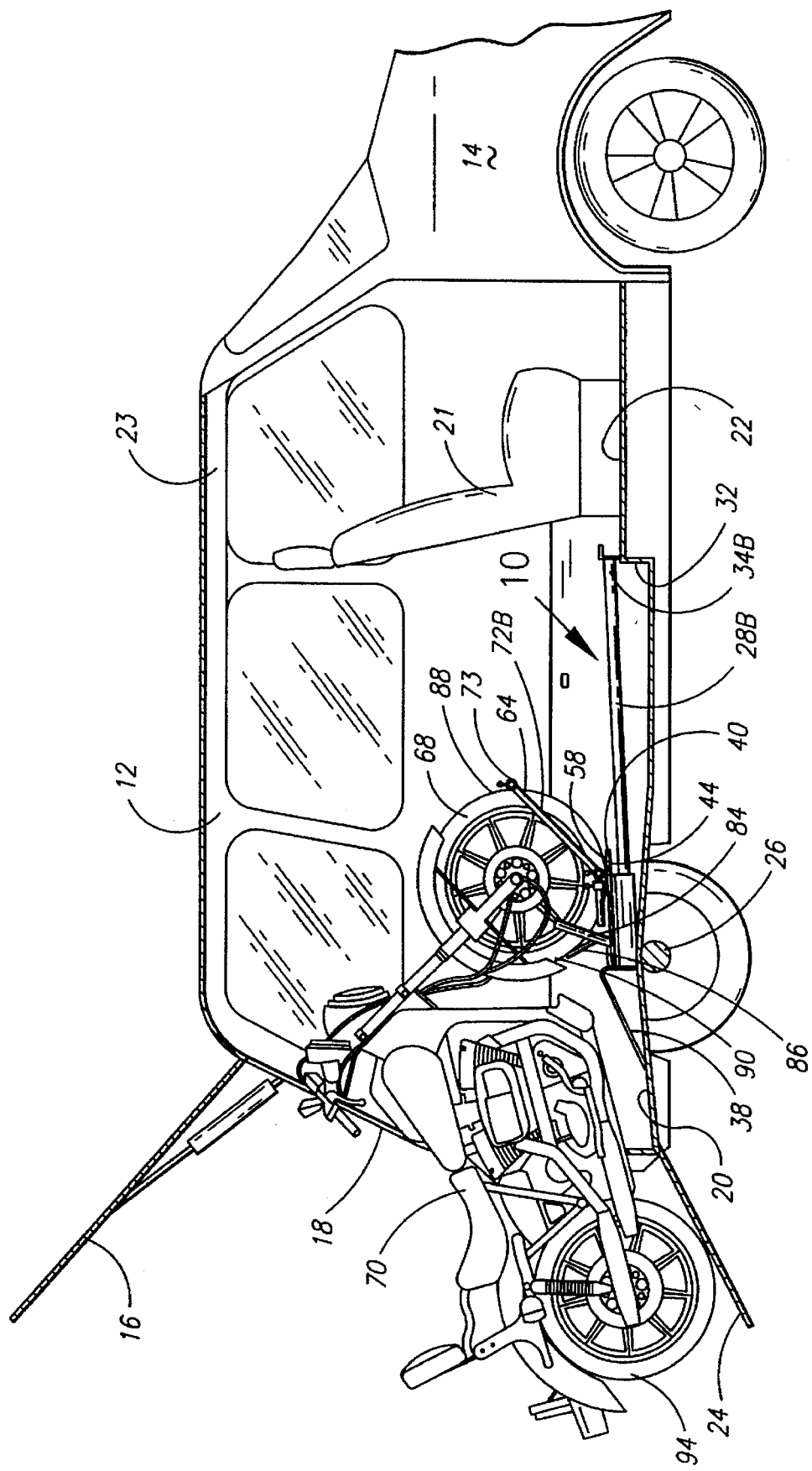
FIG. 1 is a partially cut away right side elevation of a wheelchair converted van equipped with a motorcycle ramp constructed according to a preferred embodiment of the present invention, shown with a motorcycle being secured to the motorcycle ramp.

Referring now to FIG. 1, there is illustrated a motorcycle ramp 10 constructed in accordance with a preferred embodiment of the present invention. The motorcycle ramp 10 is installed within a rear passenger compartment 12 of a van 14, usually a mini-van, which has been previously modified in order to allow wheelchairs (not illustrated) to be loaded into the van 14 via a rear door 16 located at a rear end 18 of the van 14.

Figure 2:
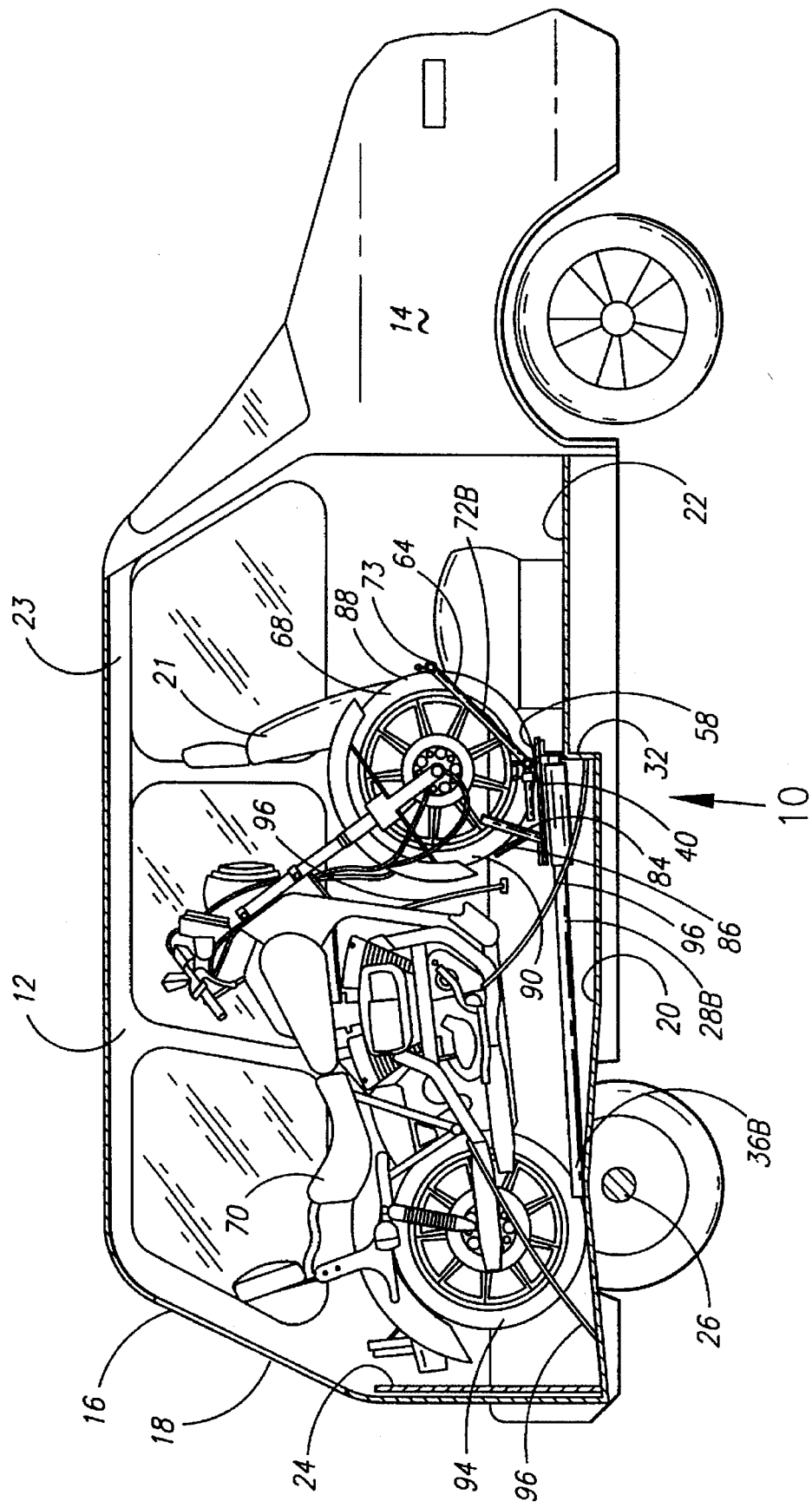
FIG. 2 is a partially cut away view similar to FIG. 1, showing the motorcycle loaded within the rear passenger compartment of the van by employing the motorcycle ramp.

As illustrated in FIGS. 1 and 2, the wheelchair converted van 14 is provided with a lowered rear floor 20 which is lowered below the level of the normal floor 22 in the front passenger compartment 23 of the van 14. For clarity, the front and rear passenger compartments 23 and 12 will be assumed to be separated from each other at a ledge 32 created where the normal and lowered rear floors 22 and 20 meet, just rearward of the driver's seat 21 and the front passenger seat 25. The wheelchair converted van 14 is also provided at its rear end 18 with a rear van ramp 24 which can be lowered to the ground when the rear door 16 is opened, as shown in FIG. 1, and can be raised upward to be contained within the rear passenger compartment 12 in order that the rear door 16 may be closed, as shown in FIG. 2. The wheelchair converted van 14 is also equipped so that the rear end 18 of the van 14 can "squat" on its rear axle 26, as illustrated in FIG. 1, in order to facilitate loading or unloading a wheeled device via the rear van ramp 24, and can be raised again to its original position, as illustrated in FIG. 2, once loading or unloading is accomplished.

Figure 5:
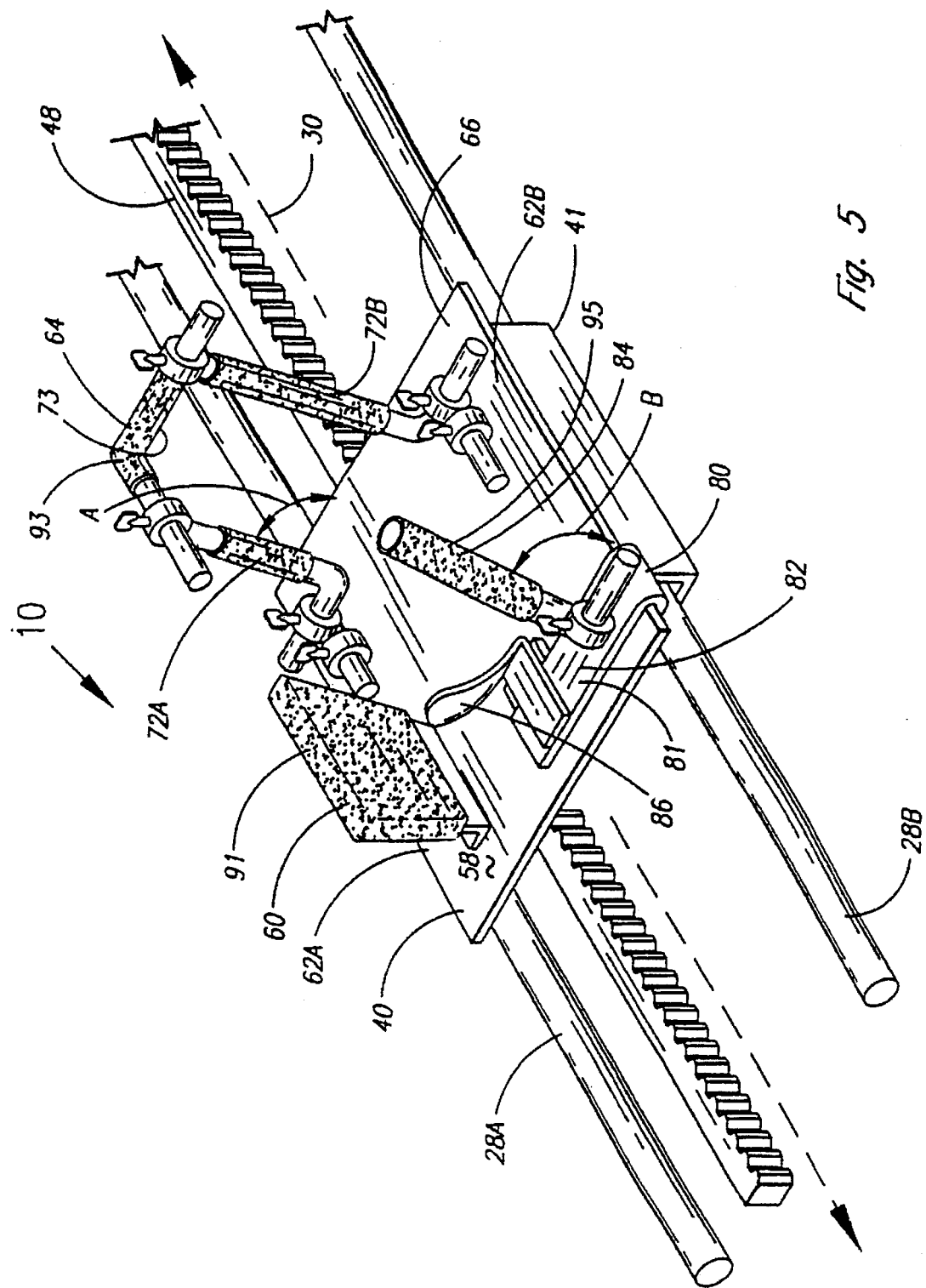
FIG. 5 is a top perspective view of the plate of the motorcycle ramp showing its alignment with the van's longitudinal axis.
Figure 6:
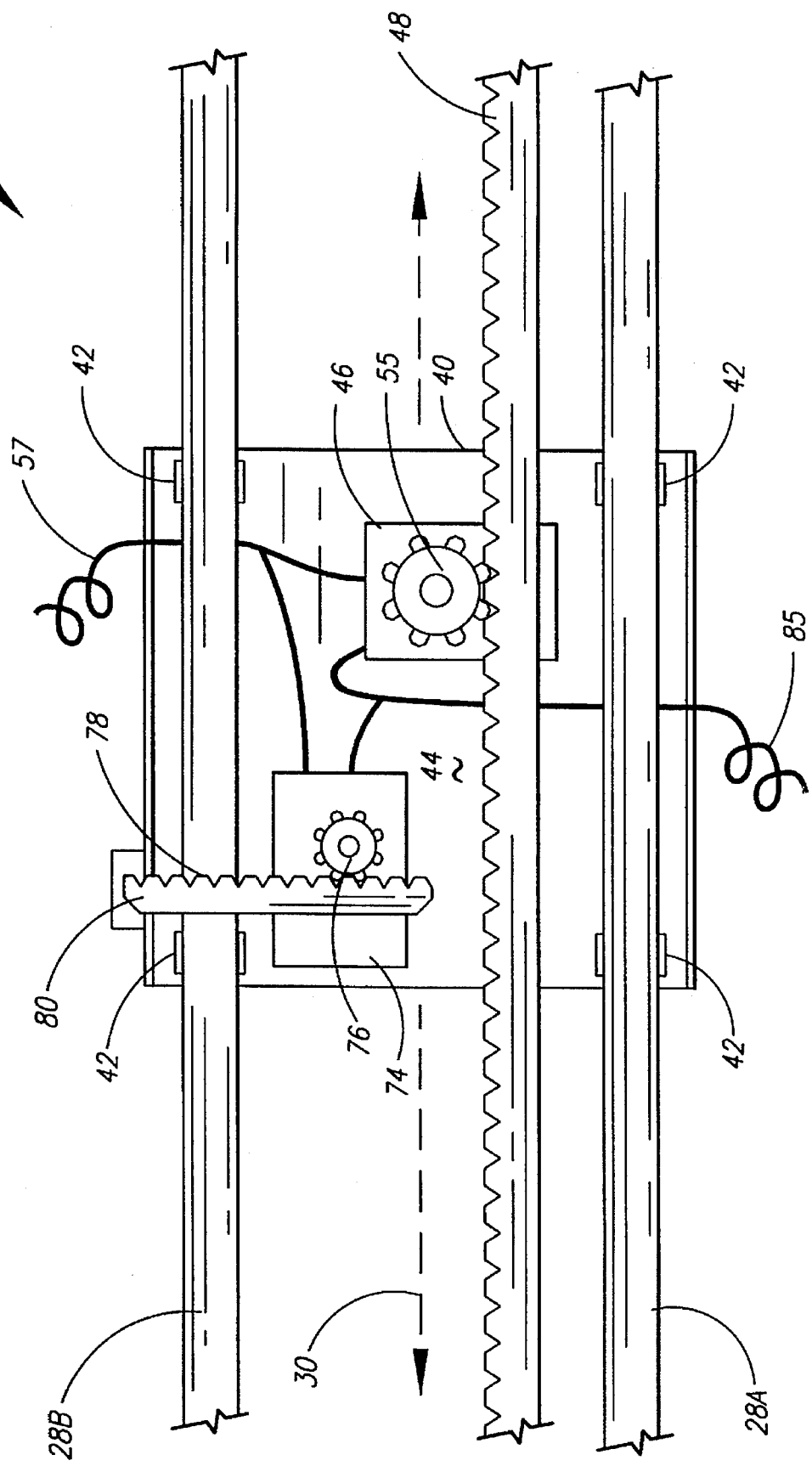
FIG. 6 is a partial bottom plan view of the motorcycle ramp with its bottom protective cover removed.
Figure 7:
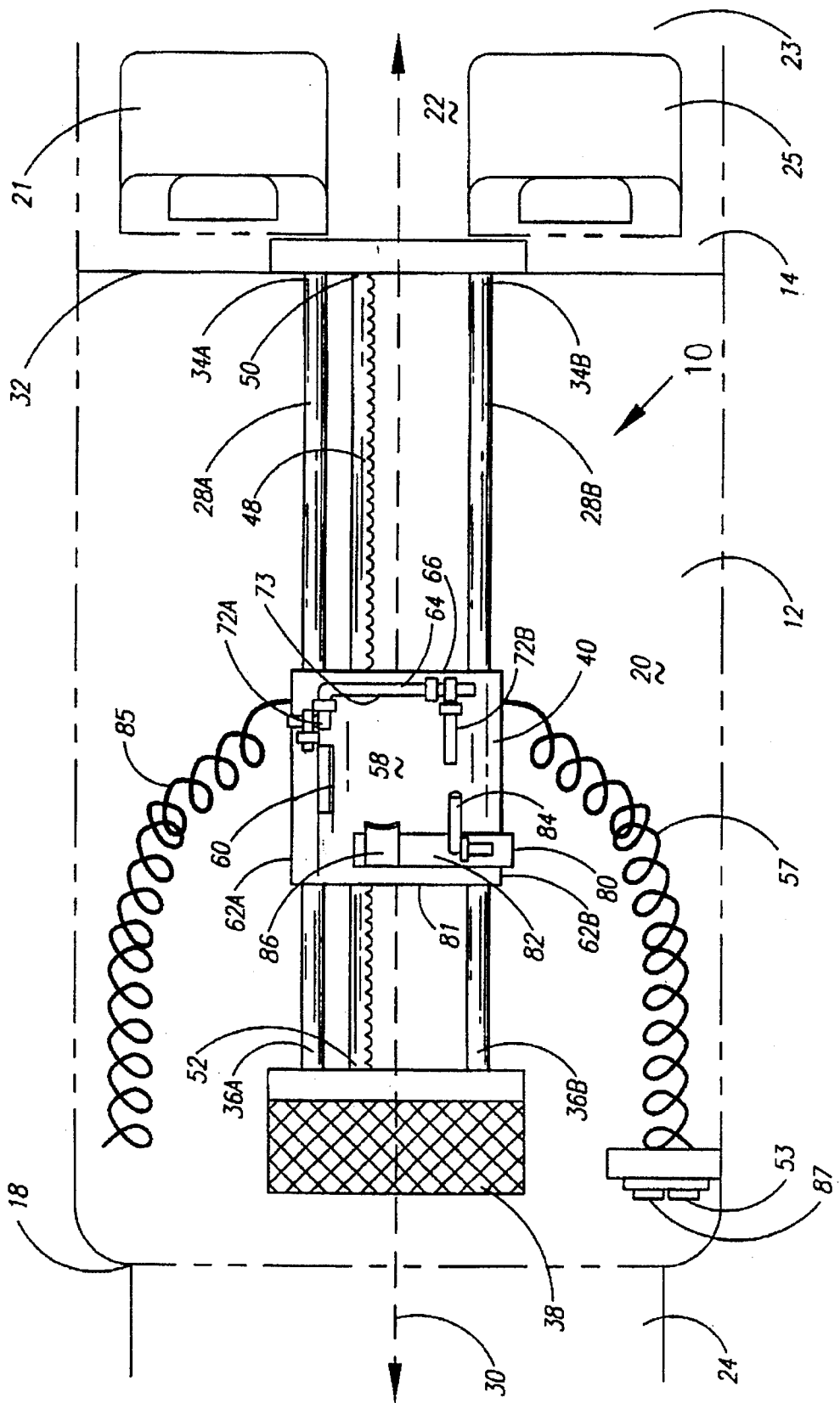
FIG. 7 is a top plan view of the motorcycle ramp.

Referring now also to FIGS. 5, 6 and 7, the motorcycle ramp 10 is provided with two supporting rails 28A and 28B which are parallel with each other and parallel with a longitudinal axis 30 of the rear passenger compartment 12 and the van 14. Front ends 34A and 34B are provided, respectively, on the supporting rails 28A and 28B secure to the normal floor 22 at the ledge 32 and rear ends 36A and 36B provided on the supporting rails 28A and 28B opposite the front ends 34A and 34B, respectively, secure to the lowered rear floor 20 adjacent the rear van ramp 24 and spaced apart therefrom in order that a removable ramp 38 may be removably placed on the lowered rear floor 20 between the rear van ramp 24 and the rear ends 36A and 36B, as will be explained more fully hereafter.

A movable plate 40 travels forward and rearward within the rear passenger compartment 12 on the supporting rails 28A and 28B. Rotatable wheels 42 are mounted on a lower surface 44 of the plate 40 and engage the supporting rails 28A and 28B in order to allow the plate 40 to travel along the supporting rails 28A and 28B. As shown in FIG. 5, the movable plate 40 is provided with a removable bottom protective cover 41 which normally covers the rotatable wheels 42 as a safety feature to prevent objects such as clothing from being caught between the wheels 42 and the supporting rails 28A and 28B or in other operative parts of the motorcycle ramp 10 as will be described hereafter. A first reversible motor 46 is provided, preferably attached to the lower surface 44 of the plate 40 and operatively engages a rack 48 which lies parallel to and between the supporting rails 28A and 28B. The rack 48 has a front end 50 which secures to the normal floor 22 at the ledge 32 and between front ends 34A and 34B of the supporting rails 28A and 28B. The rack 48 also has a rear end 52 which secures to the lowered rear floor 20 between the rear ends 36A and 36B of the supporting rails 28A and 28B. As also illustrated by FIGS. 3 and 4, the first reversible motor 46 is provided with a rotatably gear 55 and is electrically connected via a first electrical cable 57 to a first three-way switch 53. A second electrical cable 85 extends between the first reversible motor 46 and the van 14 in order to supply electricity to the motor 46.

When the first three-way switch 53, provided in the rear passenger compartment 12 near the rear end 18, is placed in a forward position 54, the gear 55 rotates and operatively engages the rack 48 in order to move the first reversible motor 46 and the attached plate 40 forward in the rear passenger compartment 12 until the plate 40 and first reversible motor 46 reach their most forward position, as shown in FIG. 2. The first three-way switch 53 is then placed in its middle or off position 51 in order to stop movement of the plate 40. When the first three-way switch 53 is placed in its reverse position 56, the first reversible motor 46 is reversed in direction, the gear 55 rotates in an opposite direction and operatively engages the rack 48 in order to move the first reversible motor 46 and the attached plate 40 rearward in the rear passenger compartment 12 until they reach their most rearward position, as shown in FIG. 1.

The plate 40 is provided with an upper surface 58 opposite the lower surface 44. A stationary upright member 60 is provided on one side 62A, preferably on the left side, of the upper surface 58 so that the stationary upright member 60 extends upward from the upper surface 58.

An adjustable inverted U-shaped front guide member 64 is provided attached to the upper surface 58 and extends above a front portion 66 of the upper surface 58 of the plate 40 so that a front wheel 68 of a motorcycle 70 can be driven up the rear van ramp 24, up the removable ramp 38 and onto the upper surface 58 of the plate 40, with the front wheel 68 cradled between upward extending arms 72A and 72B of the inverted U-shaped front guide member 64 and resting against an upward extending valley portion 73 of the front guide member 64 which extends between the two arms 72A and 72B. The arms, 72A and 72B, adjustably secure to the plate 40, with the left arm 72A being provided on the same side 62A on which the stationary upright member 60 attaches so that the inverted U-shaped front guide member 64 extends upward and forward at an angle "A" from the plate 40.

A second reversible motor 74 is also provided attached to the lower surface 44 of the plate 40. The second reversible motor 74, like the first reversible motor 46, receives electricity from the van 14 via the second electrical cable 85. Like the first reversible motor 46, the second reversible motor 74 is provided with a rotatable second gear 76 which operatively engages a threaded leg 78 of a U-shaped second rod 80 movably provided adjacent the lower surface 44. The U-shaped second rod 80 movably extends perpendicular to the longitudinal axis 30 of the rear passenger compartment 12. A second leg 82 of the U-shaped second rod 80 movably extends above and adjacent to a rear portion 81 of the upper surface 58 of the plate 40, with the threaded leg 78 and the second leg 82 joined together on a second side 62B of the upper surface 58 opposite side 62A in order to form a "U-shape".

A clamping member 84 is secured to the second leg 82 and extends upward therefrom, forming an angle "B" with the plate 40. A rear pushing member 86 is also secured to the second leg 82 so it is spaced apart from the clamping member 84 and to one side thereof, preferably to the left side, so that when a front portion 88 of the front wheel 68 of the motorcycle 70 rests against the upwardly extending valley portion 73 and between the arms 72A and 72B of front guide member 64, a second three-way switch 87, electrically connected to the second reversible motor 74 via the first electrical cable 57, can be placed in its close position 89, thus causing the second reversible motor 74 to turn the second gear 76, which operatively engages the threaded leg 78, thereby causing the U-shaped second rod 80 and its attached clamping member 84 and its attached rear pushing member 86 to move toward the stationary upright member 60 and toward a rear portion 90 of the front wheel 68, thus simultaneously moving the rear pushing member 86 behind the rear portion 90 of the front wheel 68 thus capturing the front wheel 68 between the front guide member 64 and the rear pushing member 86 and also moving the clamping member 84 toward the front wheel 68, thereby securing the front wheel 68 between the clamping member 84 and the stationary upright member 60. The second three-way switch 87 is placed in its middle or off position 83 in order to stop movement of the U-shaped second rod 80.

As best illustrated in FIG. 5, padded coatings 91, 93 and 95 are provided, respectively, on the stationary upright member 60, the front guide member 64, and the clamping member 84 in order that the motorcycle 70 not be scratched when it is engaged by the motorcycle ramp 10. The rear pushing member 86 need not be padded since it only engages a rubber part of a tire of the front wheel 68, thus presenting no danger of scratching the motorcycle 70.

To release the front wheel 68, the second three-way switch 87 is placed in its open position 92, which causes the second reversible motor 74 to turn the second gear 76 in an opposite direction, thus causing the threaded leg 78, the U-shaped second rod 80, the clamping member 84 and the rear pushing member 86 to move away from the stationary upright member 60 and the rear portion 90 of the front wheel 68, thereby releasing the front wheel 68 and the motorcycle 70 from the motorcycle ramp 10 so that the motorcycle 70 can be rolled rearward.

As shown in FIGS. 3 and 4, both the first and second three-way switches 53 and 87 are movably located in the rear passenger compartment 12 within easy reach of a rider who is driving the motorcycle 70 onto or off the plate 40 of the motorcycle ramp 10. With these operative switches, 53 and 87, so positioned, a single person can easily load the motorcycle 70 into the van 14 and unload the motorcycle 70 out of the van 14, as will be explained more fully hereafter.

OPERATION

In order to load the motorcycle 70 into the van 14, the rear door 16 is opened, the rear end 18 of the van 14 is caused to squat on the rear axle 26, and the rear van ramp 24 is lowered to the ground. Next, the removable ramp 38 is placed adjacent the motorcycle ramp 10 and between the rear ends 36A and 36B of the supporting rails 28A and 28B in order to provide a smooth incline up which the front wheel 68 of the motorcycle 70 can be rolled in order to place the front wheel 68 onto the upper surface 58 of the plate 40. Once the removable ramp 38 is in place, the motorcycle 70 is then driven or rolled into the rear end 18 of the van 14 by rolling the front wheel 68 up the rear van ramp 24, up the removable ramp 38 and onto the plate 40 until it comes to rest with a front portion 88 of the front wheel 68 resting against the upwardly extending valley portion 73 of the front guide member 64. The second three-way switch 87 is then placed in its close position 89, causing the front wheel 68 to be captured and secured in an upright position. Once the front wheel 68 has thus been secured, the rider can dismount the now stabilized motorcycle 70.

The removable ramp 38 is next removed from behind the motorcycle ramp 10 and the first three-way switch 53 is placed in its forward position 54 to pull the motorcycle 70 into the rear passenger compartment 12. The removable ramp 38 must be removed before the first three-way switch 53 is placed in its forward position 54, because a rear wheel 94 of the motorcycle 70 must rest on the lower rear floor 20 between the rear ends 36A and 36B of the supporting rails 28A and 28B when the plate 40 is in its most forward position in order for the motorcycle 70 to rest entirely within the van 14, as shown in FIG. 2. The motorcycle 70 must be entirely within the van 14 to allow the rear van ramp 24 to be raised and the rear door 16 to be closed. As shown in FIG. 2, when the motorcycle 70 is within the van 14, the front wheel 68 must be raised somewhat above the rear wheel 94 so that the motorcycle 70 rests slightly tilted backward within the rear passenger compartment 12. This tilt is accomplished by having the front wheel 68 resting on the plate 40. The plate 40 is raised above the lowered rear floor 20 by the height of the removable ramp 38 when the plate 40 is located at its most rearward position. When the plate 40 moves to its most forward position, it travels up an incline created by the supporting rails 28A and 28B by virtue of their front ends 34A and 34B being raised above their rear ends 36A and 36B. Thus, when the plate 40 reaches its most forward position, the motorcycle 70 is optimally tilted to allow the motorcycle 70 to reside entirely within the van 14.

Once the motorcycle 70 is loaded in the van 14, standard tie-down devices 96, such as ratchet-type or pull through tie-downs or other similar devices, are used to secure the motorcycle 70 in an upright position within the rear passenger compartment 12. Then the rear van ramp 24 is raised, the rear end 18 of the van 14 is raised from its squatted position on its rear axle 26 to its original, pre-squat position and the rear door 16 is closed. The motorcycle 70 is now ready to be transported within the van 14.

In order to remove the motorcycle 70 from the van 14, the tie-down devices 96 are removed, the rear door 16 is opened, the rear end 18 of the van 14 is lowered to its squatted position and the rear van ramp 24 is lowered to the ground. Next, the first three-way switch 53 is placed in its reverse position 56, causing the motorcycle 70 to move out of the rear end 18 of the van 14 until the plate 40 is at its most rearward position. The removable ramp 40 is then replaced behind the motorcycle ramp 10, the rider mounts the motorcycle 70 in order to support it and the second three-way switch 87 is placed in its open position 92. When the second three-way switch 87 is placed in its open position 92, the clamping member 84 and the rear pushing member 86 move away from the stationary upright member 60 and the front wheel 68, thus releasing the motorcycle 70 from the motorcycle ramp 10. The motorcycle 70 may then be rolled backward so its front wheel 68 rolls off the plate 40, down the removable ramp 38, down the rear van ramp 24 and onto the ground. If desired, the rear van ramp 24 can then be raised, the rear end 18 of the van 14 raised to its pre-squatted position, and the rear door 16 closed.

While the invention has been described in relation to a mini-van, use with any type of van or other similar vehicle is contemplated.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A motorcycle ramp installed in a vehicle for transporting a motorcycle within the vehicle comprising:

track means mounted at an incline on the floor of a vehicle so that a front end of the track means is raised above a rear end of said track means, a plate for receiving a front wheel of a motorcycle being movably provided on said track means, means for releasably securing said front wheel to said plate, a first reversible motor being provided on said plate, said first motor being provided with a gear for operatively engaging a rack, and said rack extending parallel with said track means.

2. A motorcycle ramp according to claim 1 further comprising:

a first switch means being provided within said vehicle, said first switch means being provided with a forward position and a reverse position, said first switch means being electrically connected to said first reversible motor such that said plate is made to travel forward in the vehicle when the first switch means is in its forward position, and said plate is made to travel rearward in the vehicle when the first switch is in its reverse position.

3. A motorcycle ramp installed in a vehicle for transporting a motorcycle within the vehicle comprising:

track means mounted at an incline on the floor of a vehicle so that a front end of the track means is raised above a rear end of said track means, a plate for receiving a front wheel of a motorcycle being movably provided on said track means, a stationary upright member extending upward from a first side and an opposite second side of an upper surface of said plate, an adjustable inverted U-shaped front guide member provided on the first side of said upper surface and forward of said stationary upright member, said front guide member extending upward from said upper surface above a front portion of said upper surface in order to removably receive a front portion of said front wheel, a clamping member and a rear pushing member being movably provided on said opposite second side of said upper surface such that said rear pushing member is closer than the clamping member to said stationary upright member and is rearward of said clamping member, said clamping member and said rear pushing member each extending upward from said upper surface such that the front wheel may be secured to the plate by moving said clamping member and said rear pushing member toward said stationary upright member.

4. A motorcycle ramp according to claim 3 further comprising:

a second reversible motor being provided on said plate, said second reversible motor being provided with a gear for operatively engaging a threaded leg of a movable U-shaped second rod, said U-shaped second rod being provided with a second leg lying above and adjacent to said upper surface of said plate, and said clamping member and said rear pushing member being secured to said second leg so that they move in conjunction with said second leg.

5. A motorcycle ramp according to claim 4 further comprising:

a second switch means being provided within said vehicle, said second switch means being provided with a close position and an open position, and said second switch means being electrically connected to said second reversible motor such that said clamping member and said rear pushing member move toward said stationary upright member when the second switch means is in its close position and said clamping member and said rear pushing member move away from said stationary upright member when the second switch means is in its open position.

6. A method for transporting a motorcycle within a vehicle comprising the following steps:

a) rolling a front wheel of a motorcycle forward onto a plate movably provided on a motorcycle ramp installed in a vehicle so that the front wheel is adjacent a stationary upright member provided on the plate and a front portion of the front wheel is received in a front guide member provided on the plate, b) placing a second three-way switch in a close position in order to cause a clamping member and a rear pushing member to move toward the stationary upright member, thereby capturing the front wheel between the front guide member at the front portion of the front wheel and the rear pushing member at a rear portion of the front wheel and clamping the wheel between the clamping member on one side of the front wheel and the stationary upright member on an opposite side of the front wheel, c) placing a first three-way switch in a forward position in order to cause the plate and attached motorcycle to be pulled forward into the vehicle along an inclined track which is raised at its front end.

7. A method according to claim 6 further comprising the following steps:

d) securing the motorcycle in an upright position within the vehicle by using tie-down devices in order to secure the motorcycle for transport within the vehicle.

8. A method according to claim 7 further comprising:

e) removing the tie-down devices from the motorcycle to prepare the motorcycle to be unloaded from the vehicle, f) placing the first three-way switch in a reverse position in order to cause the plate and attached motorcycle to be pushed rearward in the vehicle, g) placing the second three-way switch in an open position in order to cause the clamping member and rear pushing member to move away from the stationary upright member, thereby releasing the motorcycle from the motorcycle ramp, h) rolling the motorcycle rearward off the plate and out of the vehicle.

9. A method according to claim 8 wherein the following step "i" is performed before step "a" and the following step "j" is performed after step "d" but before step "e":

i) placing a removable ramp in a vehicle adjacent to and rearward of a motorcycle ramp, j) removing the removable ramp from the vehicle.

* * * * *